United States Patent Office 2,765,340
Patented Oct. 2, 1956

2,765,340

METHOD FOR PREPARING ALDIMINES

Vernon E. Haury, Simi, Calif., assignor to Shell Development Company, Emeryville, Calif., a corporation of Delaware No Drawing. Application November 28, 1952,
Serial No. 323,163

11 Claims. (Cl. 260—566)

This invention relates to a method for preparing aldimines, i. e., compounds of the formula

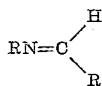

wherein R is an organic radical. More particularly, the invention relates to a novel method for preparing aldimines by reacting another aldimine with an aldehyde.

Specifically, the invention provides a new and highly efficient method for preparing new aldimines from dissimilar aldimines and aldehydes which comprises contacting the dissimilar aldimine with an aldehyde having a boiling point higher than that of the aldehyde to be formed in the reaction whereby the two components react so as to effect an exchange of the radical which is attached to the nitrogen atom through the double bond in the aldimine reactant for the radical which is attached through a double bond to the oxygen atom in the aldehyde reactant and thereby form a new aldehyde and new aldimine, and removing the formed aldehyde product from the reaction mixture substantially as fast as it is formed therein.

This application is a continuation-in-part of my application Serial No. 17,797, filed March 29, 1948, now abandoned.

Aldimines have heretofore been prepared by condensing a compound containing an amino group with an aldehyde, the reaction going forward in the presence of a condensation catalyst which is usually of the acid type. Many aldimines, however, cannot be prepared by this method, or at least the yield thereof is poor. In other cases, while some of the desired aldimine is obtained by condensing the compound containing the amino group and the aldehyde reactant together, the amount of various by-products formed are so large that the process may be considered impractical of operation.

It is, therefore, an object of the invention to provide an improved method for preparing aldimines. It is a further object to provide a method for preparing new aldimines by reacting a dissimilar aldimine with an aldehyde. It is a further object to provide a method whereby an aldimine and aldehyde are reacted together to form a new aldimine and aldehyde. It is a further object to provide a method for preparing aldimines that can be accomplished without the use of catalytic material and gives a high yield of the desired aldimine. Other objects and advantages of the invention will be apparent from the following detailed description thereof.

It has now been discovered that new aldimines can be obtained from dissimilar aldimines and aldehydes by contacting the dissimilar aldimine with an aldehyde having a boiling point higher than that of the aldehyde to be formed in the reaction whereby the two components react so as to effect an exchange of the radical which is attached to the nitrogen atom through the double bond in the aldimine reactant for the radical attached to the oxygen atom through the double bond in the aldehyde reactant and thereby form a new aldehyde and a new aldimine and removing the formed aldehyde product from the reaction mixture substantially as fast as it is formed therein.

This process may be exemplified by the following equation showing the production of N-(1-butylidene) propylamine by reacting N-(ethylidene) propylamine with butyraldehyde:

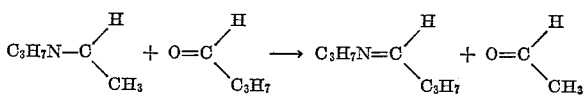

The above-described process of the invention is unobvious and could not have been foreseen. This stems in large part from the fact that the aldimine and aldehyde reactants are notably active compounds which, on being combined would be expected to condense and give rise to a wide variety of reaction products other than the desired aldimine. High yields of from 70% to 100% of the aldimine, however, are not uncommon in the present process. Particularly surprising is the fact that unsaturated aldehydes, such as methacrolein and crotonaldehyde, may be combined with the proper aldimines to produce aldimines having a conjugated system of double bonds involving three carbon atoms and the terminal nitrogen atom, a system which is rarely encountered and is difficult of operation at best.

The aldimines used in the process of the invention are those of the formula

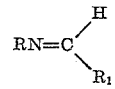

wherein both R and $R_1$ are organic radicals other than hydrogen, and are preferably hydrocarbon radicals, such as aliphatic and aromatic hydrocarbon radicals. For clarity in understanding the invention, the aldimines will be described herein and in the appended claims as substituted amines. Thus, when R and $R_1$ in the above-described formula are hydrocarbon radicals, the aldimines may be generically described as N-(hydrocarbylidene) hydrocarbylamines wherein the hydrocarbylidene group is attached to the nitrogen atom through a primary carbon atom. The expression "hydrocarbylidene" as used herein and in the appended claims refers to a hydrocarbon radical, the free bond of which consists of two adjacent valences of a single carbon atom. The expression "hydrocarbyl" as used herein and in the appended claims refers to a hydrocarbon radical, the free bond of which consists of a single valence of a single carbon atom.

Examples of the aldimines that may be used in the present process include N-(ethylidene) 1,3-dimethylbutylamine, N-(ethylidene) chlorobutylamine, N-(1-butylidene) amylamine, N-(1-isooctylidene) phenylamine, N-(1-toluylidene) decylamine, N-(1-hexylidene) 1,3-diethylamylamine, N-(1-pentylidene) nonylamine, N-(1-hexylidene) methallylamine, N-(1-propylidene) cyclohexylamine, N-(2-propen-1-ylidene) 1,3-dimethylbutylamine, N-(2-propen-1-ylidene) 1,3-diethylhexylamine, N-(1-butylidene) 2-cyclohexenylamine, and N-(1-decylidene) 2,4-hexadienylamine.

Preferred aldimines to be used in the present process are the N-(1-alkylidene) alkylamines and the N-(1-arylalkylidene) alkylamines, the N-(1-alkylidene) alkenylamines and N-(1-arylalkylidene) alkenylamines, the N-(alkylidene) cycloalkylamines and the N-(1-arylalkylidene) cycloalkylamines, the N-(1-alkylidene) arylamines and the N-(1-arylalkylidene) arylamines and the N-(1-alkylidene) alkarylamines and the N-(1-arylalkylidene) alkarylamines. Examples of these preferred aldimines include N-(1-butylidene) decylamine, N-(1-hexylidene) amylamine, N-(1-benzylidene) octylamine, N-(1-toluylidene) allylamine, N-(1-octylidene) methallylamine, N-(1-isooctylidene) cyclohexylamine, N-(1-toluylidene) cyclopentylamine, N-(1-propylidene) phenylamine, N-(1-benzylidene) phenylamine, N-(1-hexylidene) 3-methylphenylamine, and N-(1-benzylidene) 4-isopropylphenylamine.

Of special interest, particularly because of the ease of operation of the process, are the aliphatic aldimines, such as those of the formula

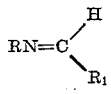

wherein R is an alkyl radical, preferably containing from 1 to 10 carbon atoms, and $R_1$ is an aliphatic open-chain hydrocarbon radical, preferably containing from 1 to 10 carbon atoms, and an alkyl radical or alkenyl radical containing from 1 to 4 carbon atoms.

The aldimines described above may be prepared by a variety of methods known to the art. Many of them may, for example, be prepared by catalytic reduction of the corresponding nitriles or by the reaction of a primary amine with an aldehyde. Many of the aldimines may also be prepared by the presently described process.

The aldehyde used in the process of the invention may be any aldehyde having a boiling point higher than the boiling point of the aldehyde to be formed during the reaction. The aldehyde reactant may be aliphatic, cycloaliphatic, aromatic or heterocyclic and may be saturated or unsaturated and possess straight or branched chains. Examples of such aldehydes include propionaldehyde, chloropropionaldehyde, butyraldehyde, isobutyraldehyde, valeroaldehyde, caproic aldehyde, heptoic aldehyde, methacrolein, nicotinaldehyde, cinchoninaldehyde, 2-pyrancarboxaldehyde, tetrahydropyran-2-carboxaldehyde, 2-furaldehyde, crotonaldehyde, cinnamaldehyde, p-tolualdehyde, benzaldehyde, 1-naphthaldehyde, 1-cyclohexene-1-carboxaldehyde, 1-cyclopentene-1-carboxaldehyde, and 2-4-heptadiene-1-carboxaldehyde.

Preferred aldehydes to be used in the process comprise the hydrocarbyl aldehydes, i. e., the formyl-substituted hydrocarbons, such as butyraldehyde, valeraldehyde, caproic aldehyde, heptoic aldehyde, caprylic aldehyde, isobutyraldehyde, crotonaldehyde, 2,4-heptadienal, 3,5-octadienal, cyclohexanecarboxaldehyde, 3-methyl-1-cyclohexene-2-carboxaldehyde, benzaldehyde, tolualdehyde, 3-methylbenzaldehyde, and 4-isoproplybenzaldehyde. Of this group, those that are particularly preferred are the alkanals, the alkenals, the cycloalkanals and the cycloalkenals which preferably contain no more than 12 carbon atoms, and the mono-formyl substituted aromatic hydrocarbons, such as the aryl aldehydes and alkaryl aldehyde, which preferably contain no more than 15 carbon atoms.

Of special interest, particularly because of the ease of operation of the process, are the aliphatic aldehydes, such as those of the formula

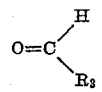

wherein $R_3$ is an aliphatic open-chain hydrocarbon radical, preferably containing from 2 to 15 carbon atoms. Alkanals and 2-alkenals containing from 3 to 8 carbon atoms are of particular value.

In the operation of the present process, any of the above-described aldimines may be reacted with any of the above-described aldehydes. Thus, N-(ethylidene) phenylamine may be reacted with isobutyraldehyde to produce N-(isobutylidene) phenylamine, N-(ethylidene) cyclohexylamine may be reacted with isohexanal to produce N-(isohexylidene) cyclohexylamine, N-(1-propylidene) octylamine may be reacted with tolualdehyde to produce N-(toluylidene) octylamine, N-(ethylidene) 1,3-dimethylbutylamine may be reacted with crotonaldehyde to produce N-(2-buten-1-ylidene) 1,3-dimethylbutylamine, and N-(ethylidene) 1,3-dimethylbutylamine may be reacted with isobutyraldehyde to produce N-(isobutylidene) 1,3-dimethylbutylamine.

The reaction between the above-described aldimines and aldehydes is accomplished by merely bringing the two components together and removing the formed aldehyde substantially as fast as it is formed in the reaction mixture. The aldimines and aldehydes may be combined with either one or both in stoichiometric excess, such as from 1 to 3 mols of the one compound for every mol of the other. Generally speaking, however, the most advantageous results in respect to the yield of aldimine product are obtained through use of the reactants in the mol for mol proportions which are theoretically required.

The aldimine and aldehyde generally readily react together merely on contact so there is usually no need to apply external heat to effect the reaction. However, as the aldehyde formed in the reaction must be removed substantially as fast as it appears therein, and such removal is preferably effected by the use of distillation, sufficient heat should be maintained to insure the removal of the said aldehyde product in the distillate. In most cases, it is preferred to maintain the temperature at or slightly above the boiling temperature of the aldehyde product which is to be removed, but in some cases still higher temperatures may be utilized. In general, temperatures used in the process may vary from 30° C. to 250° C., and more preferably from 50° C. to 150° C. In many cases, the reaction between the aldimine and aldehyde is exothermic and, in those cases where the formed aldehyde has a relatively low boiling point, it may be desirable to use some cooling means to maintain the desired temperature.

The reaction is preferably conducted at atmospheric pressure, but in some instances it may be desirable to use superatmospheric or subatmospheric pressures. One instance where it may be desirable to use subatmospheric pressure is where the aldehyde product to be removed from the reaction mixture has a boiling point which is higher than the temperature at which it is desired to conduct the reaction. In such a case, the establishment of a subatmospheric pressure in the reaction chamber permits removal of the aldehyde at a lower temperature than would otherwise be possible.

The time required for the reaction will vary over a considerable range depending on the type of reactants used in the process, use of catalytic materials as described hereinafter, and the temperature selected. In most instances, in the absence of catalytic material, the reaction may be completed in from 2 to 5 or 6 hours. The reaction is generally continued until no more of the aldehyde formed in the reaction is recovered in the distillate.

As indicated above, the process may be conducted in the presence or absence of catalytic material. In some instances, it may be desirable to speed the reaction by adding catalytic material, such as an acid-acting salt, as zinc chloride, sodium acid phosphate and sodium bisulfate as well as acids, such as hydrochloric, sulfuric acid, sulfurous acid, selenic acid, orthophosphoric acid and benzenesulfonic acid. In general, an amount of catalyst ranging from 0.01% to 5%, and preferably from 0.5% to 1%, based on the weight of the aldimine reactant, represents a suitable amount when carrying on the process of the invention in the liquid phase and in a batchwise manner. However, it should be noted that in the preferred practice of the invention, no catalyst is employed.

The process of the invention may be carried out in the presence or absence of solvents or diluents. In general, however, solvents or diluents are not employed as both the aldehyde and aldimine reactants as well as the imine product, are normally liquid at the temperature employed. If a solvent or diluent is used, as to place the mixture in a more fluid condition, it should be a material which is both liquid and inert under the prevailing reaction conditions. Materials which may be used for this purpose are, for example, isooctane, xylene, dioxane and diethylene glycol diethyl ether.

The process of the invention may be carried out in a batchwise, continuous or semi-continuous manner. For batch treatment, the aldimine and aldehyde reactants are preferably introduced into a reaction vessel equipped with distillation means and the temperature maintained sufficiently high to remove the aldehyde product in the distillate substantially as fast as it is formed in the reaction mixture. If a continuous operation is desired, it is preferably accomplished by adding the aldehyde and aldimine continuously or intermittently to the reaction vessel as the reaction progresses and continuously removing the aldehyde product by distillation.

After the reaction is complete, the aldimine product is separated from the other components of the mixture of which it forms a part by any convenient manner. A preferred separation method is that of fractional distillation, at reduced pressure if necessary, as the aldimines are normally stable materials that can be volatilized without decomposition. However, other methods of separation may be used.

To illustrate the manner in which the invention may be carried out, the following examples are given. It is to be understood, however, that the examples are for the purpose of illustration and the invention is not to be regarded as limited to any of the specific materials or conditions recited therein.

*Example I*

Approximately one mol of N-(ethylidene) 1,3-dimethylbutylamine was combined with one mole of isobutyraldehyde in a glass reaction flask equipped with distillation means. When mixed, the components rapidly reacted together under exothermic conditions. The temperature was maintained so as to permit removal of the acetaldehyde formed in the reaction. When no more acetaldehyde was recovered, the mixture was distilled to recover 0.6 mol of N-(isobutylidene) 1,3-dimethylbutylamine. This product was identified by acid hydrolysis.

In a similar manner, N-(pentylidene) 1,3-dimethylbutylamine is produced by reacting N-(ethylidene) 1,3-dimethylbutylamine with pentanal, and N-(isohexylidene) 1,3-dimethylbutylamine is produced by reacting N-(ethylidene) 1,3-dimethylbutylamine with isohexanal.

*Example II*

Approximately two mols of N-(1-propylidene) octylamine is combined with approximately two mols of benzaldehyde in a glass reaction flask described in Example I. The mixture is maintained at reflux and propionaldehyde recovered as fast as it is formed in the reaction mixture. When no more propionaldehyde is recovered, the mixture is distilled to recover N-(benzylidene) octylamine. This product is also identified by acid hydrolysis.

N-(toluylidene) octylamine is prepared in a similar manner by replacing the benzaldehyde in the above-described process with tolualdehyde.

*Example III*

Approximately two mols of N-(ethylidene) 1,3-dimethylbutylamine is combined with approximately two mols of crotonaldehyde in a glass reaction flask equipped with distillation means. When mixed, the components react together under exothermic conditions. The temperature is maintained so as to permit removal of the acetaldehyde formed in the reaction. When no more acetaldehyde is recovered, the mixture is distilled to recover a large yield of N-(2-buten-1-ylidene) 1,3-dimethylbutylamine.

N-(2-methyl-2-propen-1-ylidene) 1,3-dimethylbutylamine is prepared in a similar manner by replacing the crotonaldehyde by an equivalent amount of methacrolein, and N-(2-propyn-1-ylidene), 1,3-dimethylbutylamine is prepared by replacing the crotonaldehyde with an equivalent amount of propargyl aldehyde.

*Example IV*

Approximately 1 mol of N-(1-propylidene) phenylamine is combined with approximately 1 mol of tetrahydrobenzaldehyde in the aforedescribed glass reaction flask. The mixture is maintained at reflux and propionaldehyde recovered as fast as it is formed in the reaction mixture. When no more propionaldehyde is recovered, the mixture is distilled to recover N-(1-tetrahydrobenzylidene) phenylamine.

*Example V*

Approximately 1 mol of N-(1-propylidene) allylamine is combined with approximately 1 mol of caproic aldehyde. The mixture is maintained at reflux and propionaldehyde recovered as fast as it is formed in the reaction mixture. When no more propionaldehyde is recovered, the mixture is distilled to recover N-(1-hexylidene) allylamine.

In a similar manner, N-(1-heptylidene) allylamine is produced by reacting N-(1-propylidene) allylamine with n-heptoic aldehyde.

I claim as my invention:

1. A process which comprises heating an aldimine of the formula

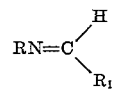

wherein $R_1$ is a member of the group consisting of alkyl radicals containing from 1 to 10 carbon atoms and alkenyl radicals containing no more than 10 carbon atoms and R is an alkyl radical containing from 1 to 10 carbon atoms with an aldehyde of the formula

wherein $R_3$ is a member of the group consisting of alkyl radicals containing from 2 to 15 carbon atoms, alkenyl radicals containing from 2 to 15 carbon atoms and aryl radicals containing no more than 15 carbon atoms, which aldehyde reactant has a boiling point higher than that of the aldehyde to be formed in the reaction, whereby there is an exchange of the $R_1$ in the aldimine reactant for the $R_3$ in the aldehyde reactant to form an aldimine and aldehyde which are different from the aldimine and aldehyde reactants, and subsequently removing the formed aldimine from the reaction mixture, said heating being accomplished at a temperature at least equal to the boiling temperature of the aldehyde formed in the reaction so as to effect a simultaneous distillation of the formed aldehyde from the reaction mixture as the reaction progresses.

2. A process as in claim 1 wherein the aldehyde reactant is benzaldehyde.

3. A process which comprises heating an aldimine of the formula

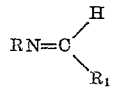

wherein $R_1$ is a member of the group consisting of alkyl radicals containing from 1 to 10 carbon atoms and alkenyl radicals containing no more than 10 carbon atoms and R is an alkyl radical containing from 1 to 10 carbon atoms, with an aldehyde of the formula

wherein $R_3$ is a member of the group consisting of alkyl radicals containing from 2 to 15 carbon atoms, alkenyl radicals containing from 2 to 15 carbon atoms and aryl radicals containing no more than 15 carbon atoms, which aldehyde reactant has a boiling point higher than that of the aldehyde to be formed in the reaction, in a mol ratio varying from 1:3 to 3:1, whereby there is an exchange of the $R_1$ in the aldimine reactant for the $R_3$ in the aldehyde reactant so as to form an aldimine and aldehyde which differ from the aldimine and aldehyde used as reactants, and subsequently removing the formed aldimine from the reaction mixture by distillation, said heating being accomplished at a temperature at least equal to the boiling temperature of the aldehyde formed in the reaction so as to effect a simultaneous distillation of the formed aldehyde from the reaction mixture as the reaction progresses.

4. The method as defined in claim 3 wherein the aldimine reactant is N-(ethylidene) 1,3-dimethylbutylamine.

5. The method as defined in claim 3 wherein the aldehyde reactant is isobutyraldehyde.

6. The method as defined in claim 3 wherein the aldehyde reactant is pentanal.

7. The method as defined in claim 3 wherein the aldimine reactant and the aldehyde reactant are employed in approximately equal molecular proportions.

8. The method as defined in claim 3 wherein the reaction is conducted at a temperature varying from 50° C. to 200° C.

9. The method as defined in claim 3 wherein the aldimine is N-(ethylidene) 1,3-dimethylbutylamine and the alkenal is methacrolein.

10. The method as defined in claim 3 wherein the aldehyde reactant is crotonaldehyde.

11. The method as defined in claim 3 wherein the aldimine reactant is N-(ethylidene) isopropylamine.

References Cited in the file of this patent

UNITED STATES PATENTS

| | | |
|---|---|---|
| 1,726,713 | North | Sept. 3, 1929 |
| 1,780,149 | Powers | Oct. 28, 1930 |

OTHER REFERENCES

Franklin: Nitrogen System of Compounds (1935), p. 254.